INVENTOR
JOHN L. ANDERSON

Thomas & Crickenberger
ATTORNEYS

United States Patent Office 3,021,440
Patented Feb. 13, 1962

3,021,440

CRYOGENIC CIRCUIT WITH OUTPUT THRESHOLD VARIED BY INPUT CURRENT

John L. Anderson, Poughkeepsie, N.Y., assignor to International Business Machines Corporation, New York, N.Y., a corporation of New York Filed Dec. 31, 1959, Ser. No. 863,322
9 Claims. (Cl. 307—88.5)

This disclosure relates to superconductive circuits and more particularly to such circuits in which increments of current are diverted from one parallel path to another.

In many applications of superconductive circuits to computers and components thereof, the technique of diverting all of the current from one path to another for control or for storage purposes is used quite extensively. However, in these applications, generally all or almost all of the current in a given path is diverted to another path. Certain superconductive logical circuits employ this technique, such as, the circuits disclosed in the article by D. A. Buck, "The Cryotron-A Superconductive Computer Component," Proceedings of the IRE, pp. 482–493; April 1956. This article discloses, for example, a superconductive flip-flop circuit including a pair of parallel paths. Current flow through the flip-flop is diverted from one of the paths to the other, and vice versa, by control pulses applied to cryotrons in each of the paths. The current flow through one of these paths indicates one of the stable states of the flip-flop, and current flow through the other of the paths is indicative of a second state of the flip-flop. Other superconductive computer circuits, such as ring circuits and shift registers, also employ the total diversion of current technique. In these circuits the diversion of current from one path to another may be indicative of information stored in a given stage, or the diversion of current may control the transfer of information to a suceeding stage.

The present invention provides current diversion in increments from one path to another by controlling the time constant of current transfer, the amplitude of input pulses or the duration of input pulses. This may be accomplished by providing two circuits connected in parallel the second of which includes more inductance that the first to lengthen the time constant of current transfer between the two circuits. Input pulses are applied to a control winding of a cryotron in the first circuit. These input pulses may make the cryotron normal or resistive, thereby causing a diversion of current from the first circuit to the second circuit. The amount of current so diverted is dependent then upon the duration of the input pulses and the time constant of current transfer, and these factors may be so chosen as to give incremental transfer of current upon the occurrence of each input pulse.

A further feature of this invention is in the provision of a superconductive circuit employing an incremental current diversion technique which includes an increment quantizing circuit to standardize the diverted increment of current so that this increment of current is not dependent upon the magnitude or width of the input pulses above a certain minimum magnitude or width.

Another feature of the present invention resides in a superconductive circuit employing an incremental current diversion technique in which the current diverted from one circuit to another is employed to aid the input pulses so that the circuit may operate on smaller, shorter or fewer subsequent inputs.

Another feature of the present invention is in the provision of a superconductive circuit in which current is diverted in increments from a first path to a second path in response to successively smaller inputs which circuit may be employed as a "Learning" circuit.

These and other features of this invention may be more fully appreciated when considered in the light of the following specification and drawings in which.

Figures 1, 2:
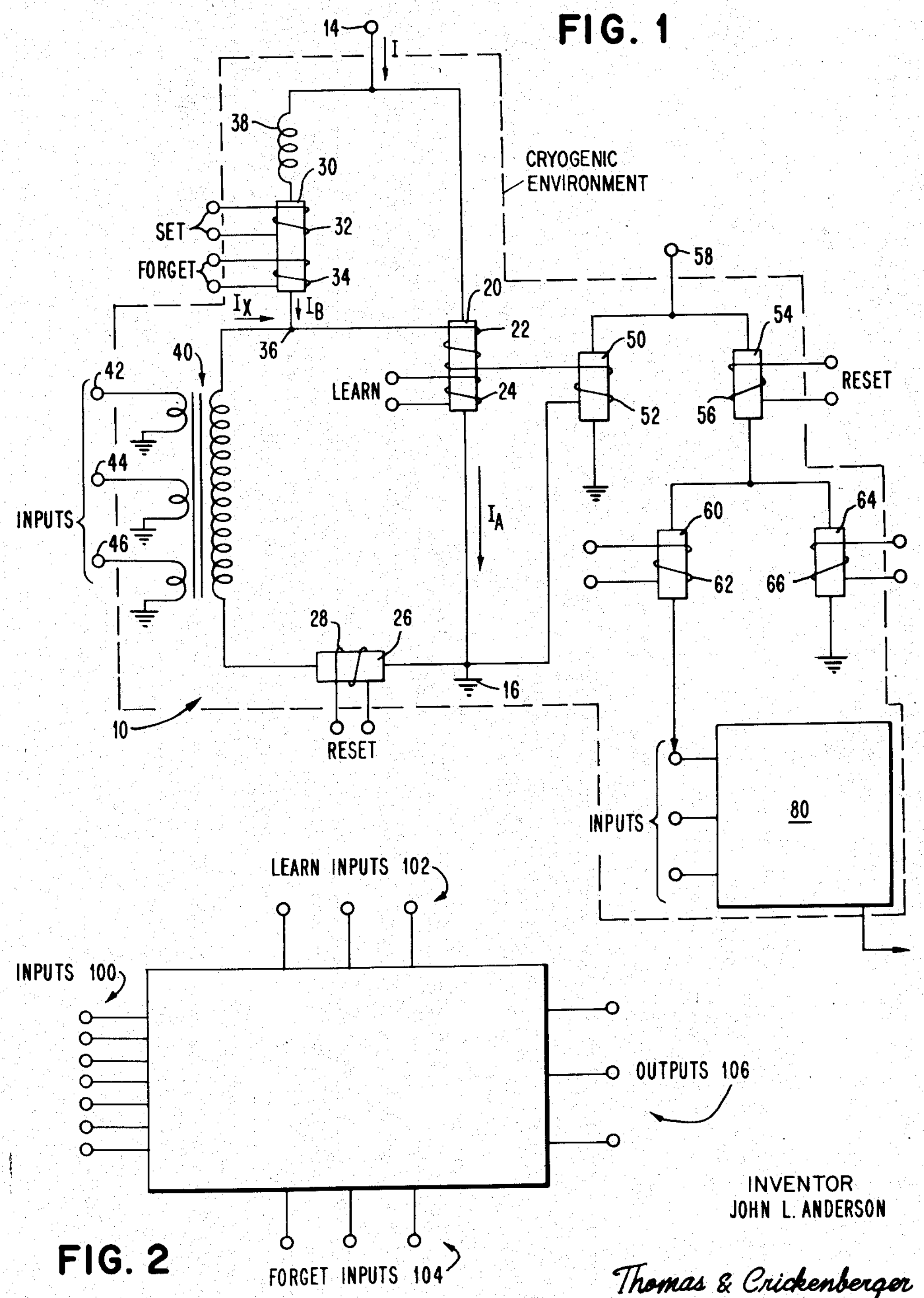
FIG. 1 is an illustration of a superconductive circuit employing the principles of this invention.
FIG. 2 is a block diagram representation of a "learning" computer employing the principles of this invention.

Each of the gates of the cryotrons in the circuits disclosed herein is constructed of a material which is in a superconductive state at the operating temperature of the circuit in the absence of a magnetic field, but each gate is driven resistive by a magnetic field produced when a current greater than a predetermined minimum or threshold current is caused to flow in its control winding. The remaining portion of the circuit, that is, the cryotron control windings, the inductances, the transformers and the connections between the various components are fabricated of a superconductor material which remains in a superconductive state under all conditions of the circuit operation. For example, the gates may be constructed of tantalum, and the remaining portions of the circuit may be constructed of niobium, or other suitable materials may be employed, such as those discussed in the above article by D. A. Buck. The magnitude of current flowing through each element of the circuit is chosen so as not to exceed the threshold current of that particular element. While the cryotrons shown in the drawings are depicted as the wire-wound type, this is done because it is believed that this type of representation provides a more graphic illustration. However, in practice film-type cryotrons are preferably employed in circuits constructed and operated in accordance with the principles of the present invention. For a detailed discussion of film-type cryotrons and the manner in which they may be constructed, reference may be made to the co-pending applications, Serial No. 625,512 and Serial No. 765,760, filed on November 20, 1956 and October 7, 1958, respectively, both of which have been assigned to the assignee of the present invention.

FIG. 1 shows a circuit 10 which is connected to a substantially identical circuit 80. In each of these circuits, 10 and 80, increments of current are diverted from one path to another in response to input pulses. Each of these circuits may be termed a "Learning" circuit and its function and operation will be explained in greater detail hereinafter. Referring now to the circuit 10, current is applied to a terminal 14. This current may flow in either of two currents paths defined by: (1) a cryotron gate 20 and a ground terminal 16; and (2) an inductance 38, a cryotron gate 30, a terminal 36, a winding 22 wound on the gate 20, a winding 52 wound on a gate 50 and the ground terminal 16. A Set winding 32 and a Forget winding 34 are wound on the gate 30 to divert a current $I_B$ from the gate 30, or $I_B$ current path, to the gate 20, or $I_A$ current path. The winding 22 and a Learn winding 24 are wound on the gate 20 to divert a current $I_A$ from the gate 20 path to the gate 30 path. The inductance 38 is inserted in the path of current $I_B$ in order to lengthen the time constant of current transfer between the two current paths. Inputs are applied to the winding 22 through input terminals 42, 44 and 46 and a transformer 40. A reset cryotron having a gate 26 and a winding 28 is connected between the transformer 40 and the ground terminal 16. A pair of gates 50 and 54 having windings 52 and 56, respectively, provides an output for the circuit 10. This output may be applied to a load circuit such as the circuit 80, which is essentially identical to the circuit 10, through a cryotron switch circuit including a gate 60 and a gate 64 which are controlled by windings 62 and 66, respectively.

In the operation of the circuit 10 of FIG. 1, a current source is connected between the terminals 14 and 16. The current I flows from the terminal 14 and divides as current $I_A$ and current $I_B$ between the two parallel paths defined by the gate 20 and the gate 30, respectively. The current division between the two paths is inversely proportional to the inductance in each path. Since the inductance 38 is included in the gate 30 path the majority of the current I flows as $I_A$ through the gate 20. The winding 62 is normally energized and the winding 66 is normally unenergized thereby resulting in the gate 60 being normal and the gate 64 being superconductive. A current source is applied to the terminal 58 and ground. Current from this source flows through the gate 50 to ground, and through the gates 54 and 64 to ground. A set pulse is applied to the winding 32 and a reset pulse is applied to each of the windings 28 and 56. When a pulse is applied to the Set winding 32, the current $I_B$ is forced to flow through the gate 20. When a reset pulse is applied to the winding 28, any current that may be flowing through the gate 26 is extinguished. When a reset pulse is applied to the winding 56, the current flowing through the gate 54 is forced to flow through the gate 50 to ground. The circuit 10 is now set for operation.

According to a feature of this invention if a current $I_X$ is applied to the coil 22 of FIG. 1 of a value sufficient to make the gate 20 resistive or normal, the current $I_A$ decreases and some of this current flows as the current $I_B$ in the gate 30. However, any amount of the current $I_B$ provides increased bias on the gate 20 thereby decreasing the threshold of operation of the circuit 10. Thus the next time current is applied to the coil 22, sufficient current to drive the gate 20 resistive is achieved at some current value less than $I_X$. If the response of the circuit 10 is very fast all of the current I flows as the current $I_B$. However, if the current $I_X$ applied to the coil 22 is a pulse of short duration compared to the time constant of transfer of the current $I_A$ from the gate 20 path to the gate 30 path as the current $I_B$, there is only a small increase of the current $I_B$ each time a current pulse $I_X$ is applied to the winding 22. The inductance 38 is employed in the path of the current $I_B$ to lengthen the time constant of current transfer.

In operating the circuit 10 of FIG. 1 a set of input pulses are applied to certain of the input terminals 42, 44 and 46. These input pulses provide a current pulse $I_X$ which is applied to the coil 22 of the gate 20. Assuming that this current pulse $I_X$ is sufficient to drive the gate 20 resistive, a small amount of current $I_A$ is diverted from the gate 20, or $I_A$ path, and this diverted current flows as the current $I_B$ through the gate 30, or $I_B$ path. This current $I_B$ flows through the winding 22. During the period of time determined by the time constant of current transfer the current $I_B$ continues to increase, its rate limited by the value of the inductance 38, until the input pulses are so modified that the sum of $I_X$ plus $I_B$ is insufficient to hold the gate 20 normal. The latter action occurs when the input pulses die away and, therefore, the transfer of current into the $I_B$ path ceases. The current $I_B$, even when at a maximum value, is not sufficient to hold the gate 20 normal. The magnitude of the current $I_B$ which is flowing when the input pulses die away continues to flow through the inductance 38, the gate 30 and the winding 22 and 52 to ground. This current continues to flow since a current diverted from a first path to a second path in a superconductive circuit continues to flow in the second path until it is diverted from the latter path. Hence, a smaller set of input pulses next applied drives the gate 20 normal because these pulses are aided by the amount of the current $I_B$ now flowing in the winding 22. This next applied set of input pulses causes the gate 20 to go resistive and the current $I_B$ increases further reducing the threshold or the input pulse requirement for the next diversion or transfer of current into the $I_B$ path. Thus, it can be seen that the larger the inputs, the longer or the more often they are applied, the smaller or fewer the next inputs need be. All input pulses may be quantized to "unit" values in which case a transfer of current into the $I_B$ path occurs with successively fewer inputs. Although only three input terminals 42, 44 and 46 are illustrated, it is to be understood that any number of inputs may be employed as desired.

The gates 50 and 54 provide the output for the circuit 10. The gate 50 goes resistive whenever the gate 20 goes resistive since the same current flows through their respective windings, 52 and 22. In order that the output be a pulse the reset winding 56 must be energized whenever the input pulses die away. In this case, an output from the circuit 10 is defined by the presence of current flow through the gate 54 after a reset pulse has been applied to the winding 56 followed by an input to the circuit 10. The gate 50 and the winding 52 may be so designed that one or more inputs applied to the terminals 42, 44 and 46 cause this gate to go normal. Since the gate 60 is normal and the gate 64 is superconductive, the output from the gate 54 flows through the gate 64 to ground. If it is desired to apply this output to the circuit 80, or to any other load circuit, the winding 62 is momentarily de-energized and a pulse is applied to the winding 66 thereby diverting this output current as a pulse from the gate 64 to the gate 60 through which it flows to the input of the circuit 80.

It has already been shown how the circuit 10 operates to decrease its own threshold. This may be taken to indicate that the circuit learns to respond to successively fewer inputs. According to another feature of this invention, once sufficient inputs have been applied to the circuit 10 to cause the current $I_X$ to be of a value large enough to make the gate 20 resistive and thereby initiate a transfer of current from the gate 20 path to the gate 30 path, a pulse may be applied to the Learn winding 24 to increase this transfer and thereby cause the circuit to respond subsequently to even fewer inputs. In other words the threshold of the circuit may be arbitrarily decreased by applying an external pulse to the Learn winding 24. In a like manner the threshold may be increased by applying an external pulse to the Forget winding 34. A pulse applied to the Forget winding 34 causes the gate 30 to go normal thereby decreasing the current $I_B$.

The circuit 10 of FIG. 1 may be used in a computer which can be "taught" to solve problems as contrasted to the present computers which are "programmed" to solve problems. Such computers have been given names such as "Learning Machines" and "Perceptrons." For a more detailed discussion of such computers reference may be made to the article by R. M. Friedberg, "A Learning Machine: Part I," IBM Journal, pp. 2 through 13; January 1958, and the article by I. J. Good, "Speculations on Perceptrons and Other Automata," IBM Research Lecture, RC–115; June 2, 1959.

FIG. 2 illustrates a block diagram of such a "Learning" computer. The device of FIG. 2 includes a plurality of the "Learning" circuits similar to the circuit 10 of FIG. 1, and connected together as the circuit 10 is connected to the circuit 80. The device of FIG. 2 may include a number of circuits like the circuit 10 with the output of the first circuit being connected to one or more of the inputs of the second circuit, the output of the second circuit connected to one or more of the inputs of a third circuit, and so on. It has already been shown how the circuit 10 of FIG. 1 operates to decrease its own threshold. An application of a pulse of current to the Learn input also decreases the threshold. An application of a pulse of current to the Forget input increases the threshold by decreasing the current $I_B$. The number of input, output, Learn and Forget terminals on the device of FIG. 2 merely are illustrative, and it is to be understood that different numbers of these input terminals may be employed as desired.

In operating the device of FIG. 2, a given set of inputs is applied to certain of the input terminals 100, and the response of the device is observed by interrogating the output terminals 106. Each time the inputs are applied a change of response may occur. If successive responses show a desired trend in change of response, certain of the Learn input terminals may be energized to speed up the rate at which the response seems to be approaching the desired response. Should a repeated undesired response to the set of input signals persist, the individual Forget terminals 104 may be energized possibly in a random fashion. Since the ultimate output or total response of the device of FIG. 2 is produced by the sum of the individual responses as a result of the action and interaction of the individual learning circuits, one or more and including in some cases all of the Forget terminals may be energized at one time in order to modify the existing status of the learning device and thereby modify the trend of its outputs. There may be no immediate repetition of an undesired response in the individual learning circuits if the undesired response is modified in a desired direction. When the desired response is achieved from one or more given input signal combinations, the device of FIG. 2 may be said to have learned the "correct" response.

It should be apparent that the circuit 10 of FIG. 1 has many applications. For example, the circuit may be employed to perform arithmetical or logical functions. The device may be used as an accumulator or an adder in which an output signal is developed after a predetermined number of input pulses are applied to the circuit. The circuit may be used as an AND circuit which first operates for "*n*" inputs. The circuit subsequently operates for "*n*—1," "*n*—2," etc., inputs since the threshold of the circuit is decreased for each application of inputs.

Figure 3:
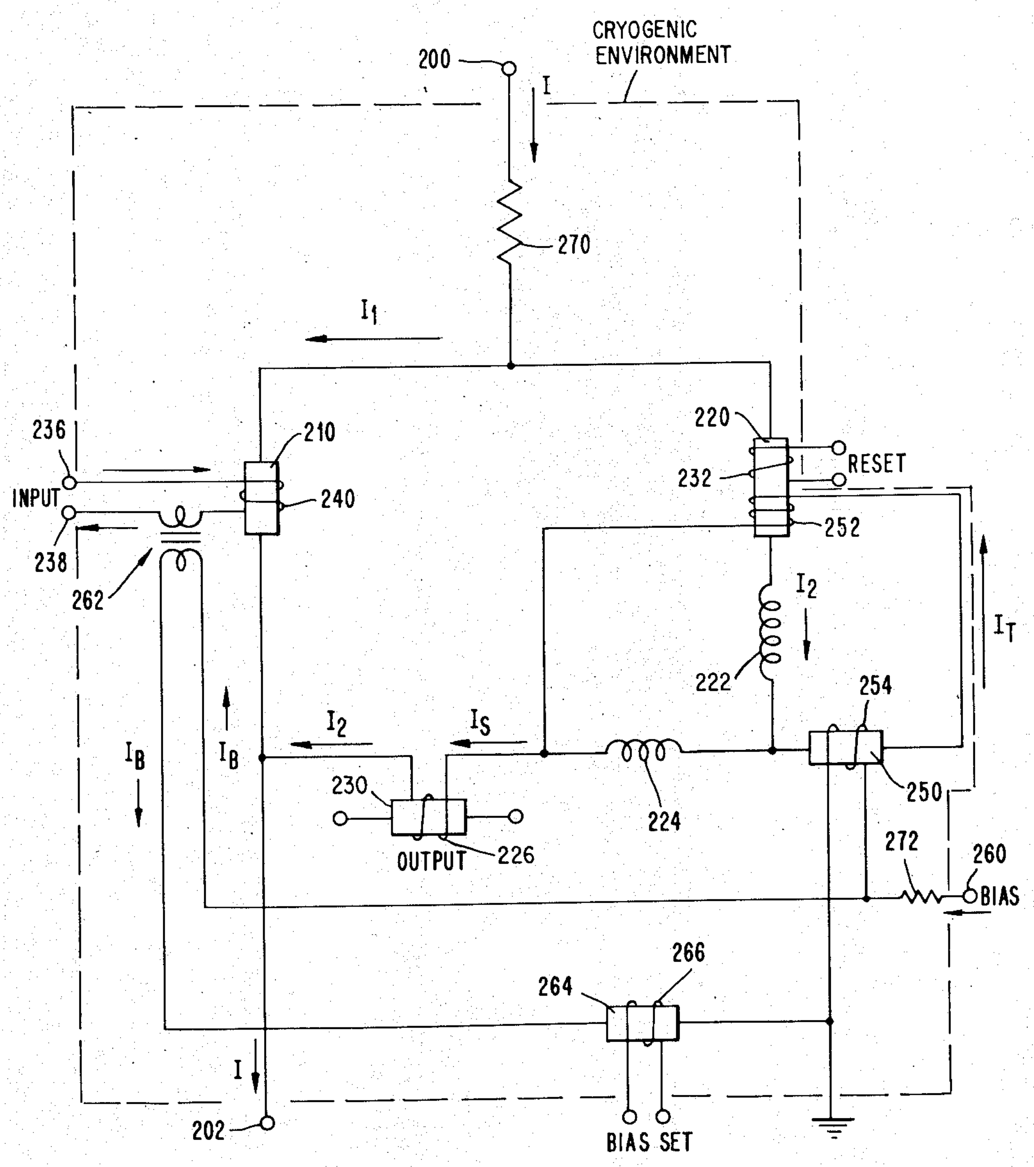
FIG. 3 illustrates another superconductive circuit constructed according to this invention.

The circuit shown in FIG. 3 is illustrative of another circuit construction employing the concepts of this invention in which certain increments of current are diverted from one path to another. In this circuit the increment of current diverted is standardized by an increment quantizing circuit. A current source is connected between the terminals 200 and 202. Two parallel circuits are defined by: (1) a gate 210; and (2) a gate 220, an inductance 222, an inductance 224 and a winding 226. The current flow through the winding 226 controls the state of the output gate 230. A reset winding 232 is employed on the gate 220 to divert the current from the gate 220 current path to the gate 210 current path. Input pulses are applied to an input winding 240 through input terminals 236 and 238. An increment quantizing circuit or limiting circuit for standardizing the increment of current caused to be diverted includes an inductance 224, a gate 250 and a winding 252 wound on the gate 220. A bias current source is connected between a terminal 260 and ground. The bias current may flow from the terminal 260 through the winding 254 to ground, and from the terminal 260 through the transformer 262 and the gate 264 to ground. A bias set pulse applied to a winding 266 of the gate 264 makes this gate go normal to thereby divert the bias current through the winding 254. Current limiting resistors 270 and 272 are employed to limit the current flow through their respective circuits.

The device of FIG. 3 integrates current increments diverted into the gate 220 path up to the threshold of the output gate 230. A current source is connected between the terminals 200 and 202 and a current I divides between the two parallel paths defined by: (1) the gate 210; and (2) the gate 220, the inductance 222, the inductance 224 and the winding 226 in inverse proportion to the inductance in each path. The current from the bias current source connected between the terminal 260 and ground flows through the winding 254 to ground, and through the transformer 262 and the gate 264 to ground. When a bias set pulse is applied to the winding 266, the gate 264 goes normal and thereby diverts the bias current from the transformer 262 and the gate 264. The bias current then flows through the winding 254 to ground and this current causes the gate 250 to go normal. A reset pulse is applied to the winding 232. This reset pulse makes the gate 220 go normal thereby causing the current I to flow through the gate 210 as a current $I_1$. It is noted here that when a current is diverted from a first path by reason of a gate in that path going normal into a second path of a superconductive circuit, the current continues to flow in the second path even though that gate in the first path goes superconductive. For example, upon the termination of the reset pulse which is applied to the winding 232, the current I continues to flow as the current $I_1$ through the gate 210 until the current $I_1$ is diverted from the gate 210 by reason of that gate going resistive. The device of FIG. 3 is now conditioned for operation.

Each input pulse to the device of FIG. 3 causes a standardized increment of current to be diverted from the gate 210 path into the gate 220 path. The application of an input pulse of sufficient magnitude to the winding 240 drives the gate 210 normal thereby causing some of the current I to flow through the gate 220 as a current $I_2$. The input pulse also establishes a current pulse $I_B$ in the secondary of the transformer 262. This current pulse $I_B$ opposes the bias current which is flowing through the winding 254 and, therefore, the gate 250 is allowed to go superconductive. The current $I_2$ flows through the inductance 222 and through the gate 250 because the inductance of the winding 252 on the gate 220 is much less than the inductance 224. The current which flows through the winding 252 is denoted $I_T$, the T denoting "transient." According to another feature of this invention, the current $I_T$ continues to increase as long as the gate 210 is resistive (as long as the input pulse remains), and when the current $I_T$ increases to a value $I_C$, the gate 220 is driven normal. As the gate 220 goes normal the current $I_2$ is decreased and, therefore, the current $I_T$ is decreased below the value $I_C$. Hence, the value of the current $I_T$ is constrained to be just less than a value $I_C$. Through this action the increment of current diverted into the gate 220 path is standardized. It is noted here that this action is rapid and the value of the inductance 224 is such that the increment of current diverted is standardized before any appreciable current can flow through the inductance 224. When the input pulse is removed, the current pulse $I_B$ dies away and the full bias current is again applied to the winding 254 thereby driving the gate 250 normal. When the gate 250 goes normal, the current $I_T$ is forced to flow through the inductance 224, which is appreciably smaller than the inductance 222, as a current $I_S$ which is a standardized increment of current. At this time the gates 210 and 220 are superconductive and the circuit rests with the current $I_2$ (at this time $I_2=I_S=I_T$) flowing in the winding 226 and a current $I_1$ (which is now equal to $I-I_2$) flowing in the gate 210. Each input pulse may have any magnitude or width provided that the magnitude or width is sufficient to drive the gate 210 resistive long enough for the current $I_T$ to be established. Therefore, the circuit of FIG. 3 is insensitive to both the magnitude and the width of the input pulses which are above a certain minimum magnitude and width.

The next input pulse applied to the winding 240 drives the gate 210 normal and again a current $I_T$ flows through the winding 252. This current $I_T$ is again limited to a value just less than $I_C$. When the input pulse is removed, this current $I_T$ is forced to flow through the inductance 224 as a current $I_S$. The current now flowing through the inductance 224 and the winding 226 is a value of $2I_S$. Hence, $I_2$ is doubled. The circuit now rests in this state. The third input pulse to the winding 240 causes a similar action to occur and when this pulse is removed, $I_2$ is a value of $3I_S$. This action continues with each succeeding input pulse until the current $I_2$ becomes large enough to drive the output gate 230 normal. The circuit of FIG. 3 may be so designed that the output gate 230 goes normal upon the occurrence of any number of input pulses. For example, to provide a decimal counter the circuit is designed such that $I_S$ (the standardized increment of current) equals one-tenth of the critical current of the output gate 230.

A number of circuits such as that illustrated in FIG. 3 may be employed to provide the inputs to terminals 42, 44, 46 of the circuit 10 of the device of FIG. 1. In such an arrangement, the FIG. 3 circuits may be designed to provide an output upon the reception of any desired number of input pulses.

It is seen that the present invention provides circuits that have alternate current paths and in which increments of current may be diverted from one to another of these paths. The circuit may be such that successive increments of current so diverted each decrease the threshold of the circuit thereby allowing the circuit to successively operate with fewer, smaller or shorter input pulses. This incremental diversion of current technique may also be embodied in a circuit in which each successive increment of current diverted is of a standard magnitude thereby providing a circuit which is insensitive to both the magnitude and the width of the input pulses which are above a certain minimum magnitude and width. It is also seen from the foregoing description and drawings how this concept may be applied to provide logical, learning and counting circuits.

What is claimed is:

1. A superconductive circuit comprising: a first circuit means connected in parallel with a second circuit means; input means for increasing the current in increments in said first circuit means to a predetermined value; third circuit means connected with said first circuit means and having two current paths; means applying a signal current to said third circuit means whereby said signal current is diverted from a first to a second of said two current paths of said third circuit means when the current in said first circuit means increases to said predetermined value.

2. A superconductive circuit comprising: a first circuit connected in parallel with a second circuit; first means to apply current to the parallel combination of said circuits; inductance means included in said second circuit to increase the time constant of current transfer between said circuits; second means to divert current from said second circuit to said first circuit; third means to divert current from said first circuit to said second circuit in increments until a predetermined current is diverted; and means connected with said second circuit to provide an output signal; whereby an output signal is produced when said predetermined current is diverted.

3. A superconductive circuit as in claim 2 wherein said third means includes means to provide input pulses; said input pulses cause the diversion of current from said first circuit to said second circuit and also add to the current so diverted; whereby fewer or smaller input pulses are subsequently needed to provide said predetermined current.

4. A superconductive circuit as in claim 2 wherein said second circuit includes a limiting circuit; and said third means includes a pulse source for providing input pulses; whereby said limiting circuit limits the amount of current diverted from said first circuit to said second circuit upon each occurrence of an input pulse.

5. A superconductive circuit as in claim 3 wherein said third means includes a fourth means for effecting current diversion from said first circuit to said second circuit; whereby even fewer or smaller input pulses are subsequently needed to provide said predetermined current.

6. A superconductive device comprising: a pair of circuits connected in parallel; means to apply current to said circuits; first means in the second of said pair of circuits to cause said current to be diverted to the first of said pair of circuits; second means having a predetermined threshold connected in said first circuit to cause said current to be diverted from said first circuit to said second circuit; means to apply inputs to the superconductive device whereby said threshold decreases upon the application of each succeeding input; means operable to further decrease said threshold; and a means operable to increase said threshold.

7. A superconductive circuit comprising: a first circuit including a gate which may have a superconductive state or a resistive state connected in parallel with a second circuit including an inductance, a gate which may have a superconductive state or a resistive state and a control conductor coupled with the gate in said first circuit; first means applying current to the parallel combination of said circuits; second means including at least a control conductor on the gate in said second circuit to divert said current from said second circuit to said first circuit; third means coupled with said second circuit for receiving input signals whereby said current is diverted in increments from said first circuit to said second circuit; fourth means coupled with the gate in said first circuit operable to affect the increments of current diverted from said first circuit to said second circuit; and fifth means coupled with said second circuit to provide an indication when a predetermined current is diverted from said first circuit to said second circuit.

8. A superconductive circuit as in claim 1 wherein said fifth means includes at least a gate, and a control conductor thereon which is connected in said second circuit.

9. A superconductive circuit comprising: a first circuit including a first gate which may have a superconductive state or a resistive state connected in parallel with a second circuit including an inductance and a second gate which may have a superconductive state or a resistive state; first means applying current to the parallel combination of said circuits; a third circuit connected with said second circuit and including a third gate connected in series with a first control conductor on said second gate; a second control conductor on said second gate and operable to divert current from said second circuit to said first circuit; a third control conductor on said third gate; a fourth control conductor for receiving input signals on said first gate; and means interconnecting said third and fourth control conductors whereby upon the application of input signals to said fourth control conductor a limited amount of current is diverted from said first circuit to said second circuit upon the occurrence of each of said input signals which is above a predetermined minimum amplitude and width.

References Cited in the file of this patent

UNITED STATES PATENTS 2,832,897 Buck ------------------ Apr. 29, 1958

UNITED STATES PATENT OFFICE

CERTIFICATE OF CORRECTION

Patent No. 3,021,440 February 13, 1962

John L. Anderson

It is hereby certified that error appears in the above numbered patent requiring correction and that the said Letters Patent should read as corrected below.

Column 8, line 37, for the claim reference numeral "1" read -- 7 --.

Signed and sealed this 5th day of June 1962.

(SEAL)
Attest:

ERNEST W. SWIDER
Attesting Officer

DAVID L. LADD
Commissioner of Patents